2,934,436
Patented Apr. 26, 1960

2,934,436

PROCESS FOR THE PREPARATION OF A MEAT FLAVOR

Charles Gerard May, St. Neots, and Ian Douglas Morton, Bedford, England, assignors to Lever Brothers Company, New York, N.Y., a corporation of Maine No Drawing. Application October 3, 1957
Serial No. 687,868

Claims priority, application Great Britain
October 5, 1956

3 Claims. (Cl. 99—140)

The present invention relates to artificial flavoring substances and to their preparation.

By the reaction of an amino reagent comprising cysteine or cystine with glyceraldehyde, flavoring substances capable of imparting a savory taste or smell to foodstuffs, especially a meat-like taste, can be prepared.

The present invention provides, therefore, a process for the preparation of a flavoring substance which comprises reacting an amino reagent comprising cysteine or cystine with glyceraldehyde in the presence of water and at an elevated temperature.

Flavoring substances according to the invention may be obtained by using an amino reagent comprising (a) cysteine or cystine. Cysteine and its derivatives, are preferred to cystine and its derivatives, whilst mixtures of cysteine and cystine may be used, if desired. In addition to cysteine or cystine the amino reagent should preferably also comprise (b) arginine or glutamic acid or proline or histidine. With reference to component (b), the acids may be used singly, or in combination. Preferred flavors are obtained by using at least one acid from each of (a) and (b), in admixture with one or more, preferably three or more, other amino acids such as glycine, alpha and beta-alanine, threonine, lysine, leucine, iso-leucine, serine and valine.

Both racemic and naturally occurring forms of the amino acids may be used.

It is not essential to use individual amino acids: salts, simple compounds such as esters or hydroxy compounds, peptides or proteins which will give rise to the desired amino acids under the conditions of reaction can be used.

In particular, it has been found that fish protein is a suitable starting material for obtaining a mixture of amino acids for the reaction, provided that cysteine or cystine is added. Crude fish protein, such as cod flesh, may be used, but preferably, the fish protein should first be deflavored. The fish protein is then hydrolyzed, for instance, by means of hydrochloric acid or caustic soda, and substantially neutralized. The substantially neutralized hydrolyzate may be used, as such, as the amino reagent, provided cysteine or cystine is added. The hydrolyzate must be treated, for instance, with charcoal, in order to remove phenylalanine and methionine, whilst cysteine or cystine or a source thereof must be added before using the mixture. The presence of substantial amounts of phenylalanine or of methionine in mixtures tend to give rise to undesirable floral or potato-like aromas and non meat-like flavors. Small amounts of other aromatic amino acids such as tyrosine and tryptophan may not be objectionable but large amounts should preferably be avoided. Other protein hydrolyzates which have been suitably treated to remove phenylalanine and methionine such as groundnut hydrolyzate or casein hydrolyzate or mixtures of these may also be used as the amino reagent, provided cysteine or cystine or a source thereof is added.

Factors which may affect the nature and quality of the flavor produced include the nature and relative amounts of glyceraldehyde and amino reagents used, the amount of water present and the time and temperature of heating. Thus, to obtain a product having a savory flavor particularly resembling that of meat the amino reagent should preferably contain about 1–4 times, by weight of the weight of cysteine and cystine present, of amino acids additional to cysteine and cystine, or amounts of derivatives such as will give rise to an equivalent weight of such acids.

If desired, a proportion of pentose sugars, in particular ribose, may be included in reaction mixtures according to the invention. Inclusion of such pentoses generally results in reaction products which impart flavors having a greater resemblance to that of beef. Excessive amounts of pentose sugars, however, may impart excessive sweetness to the flavoring substance.

As little as 0.1 mole of aldehyde per 1 mole of amino reagent may give a satisfactory flavoring substance. By "amino reagent" is meant the total of amino acids and derivatives thereof present inclusive of cysteine and cystine. Amounts of aldehyde up to 1 mole per 1 mole of amino reagent may be used but greater amounts may be objectionable. 0.25 mole to 0.75 mole of aldehyde per 1 mole of amino reagent is preferred, the most preferred ratio being about 0.5 mole of aldehyde per 1 mole of amino reagent.

The reaction is carried out in the presence of water. The amount of water present should be at least 5, generally 15 to 25, times the amount, by weight, of the aldehyde reagent. Amounts of up to 1500 times may, however, be used.

The pH at which the reaction is carried out is not critical although the pH of the mixture at the end of the reaction should preferably not be alkaline. It is preferred to carry out the reaction at a pH of between 2 and 7.

The reaction mixture may be in the form of a solution or in the form of a slurry or sludgy mass, depending on the concentration of reagents and on the conditions of heating. In order to reduce any danger of charring, any solid reagent should be brought into solution to as great an extent as possible. Stirring of the mixed reagents may be advisable during heating to reduce the danger of local overheating. Vigorous stirring during heating may reduce the time required for completion of the reaction.

The reaction may be carried out by heating the mixture under reflux. In many cases the mixture is maintained at its boiling point for from ¼ to 4 hours, generally at least for 1 hour. It is desirable that refluxing should not be continued for more than about 12 hours. Similar results may be achieved by heating for a longer period at a lower temperature, for instance 90° C., when about 18 hours is sufficient, or 70° C., when 24 to 30 hours heating may be required, or a lower temperature for a longer time. This process may also be carried out under reduced pressure or under increased pressure when lower or higher temperatures will be necessary to maintain the mixture at or near its boiling point. A reflux condenser is normally fitted to the reaction vessel whilst the reaction is in progress. Conditions of heating should be such as to avoid substantial caramelization of the mixture. Any unreacted volatile aldehyde may be removed at the end of the reaction.

The reaction may also be carried out by adding the reagents to a food product in which it is desired to incorporate a savory or meat-like flavor and heating the product to effect reaction, for instance by autoclaving in a sealed can. When carrying out the reaction by adding the reagents to a food product it may be necessary to add a small amount of water, but generally such products will already contain sufficient water to enable the reaction to proceed.

The reaction products may be used as such, or they may be converted to freeze-dried powders. Such powders may tend to be hygroscopic.

Flavoring substances according to the invention may be incorporated in a wide range of meat or meat-like products. They may, for example, be incorporated either as solutions or powders, as is convenient, in protein gels, in luncheon meats, in dry soup mixes and in meat spreads and similar products.

The flavoring substances may be used in artificial food products where savory flavors are required, or they may be used to enhance the flavor of meat-containing products.

It is preferred to let the flavoring substance age for about 3–5 days after its preparation, when optimum flavor is generally developed. The flavoring substance may tend to lose quality after about 3 weeks from its preparation. In the absence of air and light the substance or products in which it has been incorporated tend to retain their quality of flavor longer. Freeze-dried powders generally retain quality of flavor for a longer period than solutions.

The following example illustrates the invention.

*Example*

Deflavored cod flesh (30 grams) was hydrolyzed by refluxing with 6 N-hydrochloric acid (200 grams) for 8 hr. The acid was substantially distilled off at reduced pressure and the residual hydrolyzate after addition of water was filtered and brought to pH=6.7 with caustic soda. The dark colored solution was then passed through a short column (3" x 2") of activated charcoal giving a water-white solution. This solution (300 ml., containing 4.2 mg. of Kjeldahl nitrogen/ml.) was then heated to boiling, under reflux, for 3 hours after adding glyceraldehyde (5 g.) and L-cysteine (6 g.). The excess glyceraldehyde was removed and the contents cooled to room temperature and stored for several days in a closed vessel. A savory meat-like flavor developed during this time.

We claim:

1. A process for the preparation of a meat flavor, which comprises heating cysteine with glyceraldehyde in the presence of water until a meat flavor develops.

2. A process for the preparation of a meat flavor, which comprises heating an amino reagent comprising cysteine and at least one amino acid selected from the group consisting of proline, glutamic acid, arginine and histidine with glyceraldehyde in the presence of water until a meat flavor develops.

3. A process for incorporating a meat flavor in a food product, which comprises adding to the food product glyceraldehyde and an amino reagent comprising cysteine and at least one amino acid selected from the group consisting of proline, glutamic acid, arginine and histidine, and heating in the presence of water until a meat flavor develops.

References Cited in the file of this patent

UNITED STATES PATENTS 2,103,495    Ruckdeschel _____ Dec. 28, 1937

FOREIGN PATENTS 197,367    Great Britain _____ Mar. 18, 1918

OTHER REFERENCES

"Organic Chemistry," by Karrer, Nordeman Publishing Co. Inc., N.Y., 1938, pp. 310 and 311.

"The Chemistry and Technology of Food and Food Products," second edition, by Jacobs, vol. I, Interscience Publishers, Inc., N.Y., 1951, pp. 209 and 215.

UNITED STATES PATENT OFFICE
CERTIFICATE OF CORRECTION

Patent No. 2,934,436                      April 26, 1960

Charles Gerard May et al.

It is hereby certified that error appears in the printed specification of the above numbered patent requiring correction and that the said Letters Patent should read as corrected below.

Column 1, line 19, for "cysteine of" read -- cysteine or --; column 4, line 29, list of references cited, under "FOREIGN PATENTS", for "197,367" read -- 107,367 --.

Signed and sealed this 11th day of October 1960.

(SEAL)
Attest:

KARL H. AXLINE
Attesting Officer

ROBERT C. WATSON
Commissioner of Patents